(12) United States Patent
Chen et al.

(10) Patent No.: US 9,197,469 B2
(45) Date of Patent: Nov. 24, 2015

(54) SYSTEM AND METHOD FOR FREQUENCY OFFSET ESTIMATION FOR SIGNALS CONTAINING MULTI-USER SYMBOLS

(71) Applicant: BLACKBERRY LIMITED, Waterloo (CA)

(72) Inventors: Dayong Chen, Kitchener (CA); Yi Wen Liu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 152 days.

(21) Appl. No.: 13/757,903

(22) Filed: Feb. 4, 2013

(65) Prior Publication Data
US 2014/0219397 A1    Aug. 7, 2014

(51) Int. Cl.
*H04L 27/22* (2006.01)
*H03D 3/22* (2006.01)
*H04L 27/16* (2006.01)

(52) U.S. Cl.
CPC ..................... *H04L 27/16* (2013.01)

(58) Field of Classification Search
CPC . H04L 27/22; H04L 27/2332; H04L 27/2647; H04L 27/18; H04L 27/0008; H04L 1/0618; H04L 1/06; H04L 5/0007; H04L 2027/003; H04L 27/2276; H04L 2027/0057; H04L 27/16; H04B 7/0417
USPC .......................................... 375/279, 329, 316
See application file for complete search history.

(56) References Cited

U.S. PATENT DOCUMENTS

| | | | |
|---|---|---|---|
| 2002/0110206 A1* | 8/2002 | Becker et al. ................. | 375/346 |
| 2013/0107990 A1* | 5/2013 | Zhang et al. .................. | 375/329 |
| 2013/0234834 A1* | 9/2013 | Lampe et al. ................. | 340/10.2 |
| 2014/0029649 A1* | 1/2014 | Candell et al. ................ | 375/148 |

FOREIGN PATENT DOCUMENTS

| WO | 01/86904 A1 | 11/2001 |
|---|---|---|
| WO | 2011/042881 A1 | 4/2011 |

OTHER PUBLICATIONS

Michael A. Ruder et al., "Radio Resource Allocation for OSC Downlink Channels", Communications in China Workshops (ICCC), 2012 1st IEEE International Conference on, IEEE, Aug. 15, 2012, pp. 113-118.
Raimund Meyer et al., "Efficient Receivers for GSM MUROS Downlink Transmission", IEEE 20th International Symposium on Personal, Indoor and Mobile Radio Communications (PIMRC 2009), IEEE, Piscataway, NJ, USA, Sep. 13, 2009, pp. 2399-2403.
Mahesk Gupta Vutukuri et al., "SAIC Receiver Algorithms for VAMOS Downlink Transmission", Wireless Communication Systems (ISWCS), 2011 8th International Symposium on, IEEE, Nov. 6, 2011, pp. 31-35.
Extended European Search Report dated Jul. 12, 2013 issued in respect of European Patent Application No. 13153861.3.
Meyer, Raimund, et al.; "Efficient Receivers for GSM MUROS Downlink Transmission", IEEE, 2009, pp. 2399-2403.
3GPP TR 45.914 V10.1.0 (Nov. 2011); 3rd Generation Partnership Project; Technical Specification Group GSM/EDGE Radio Access Network; Circuit switched voice capacity evolution for GSM/EDGE Radio Access Network (GERAN) (Release 10).

* cited by examiner

*Primary Examiner* — Ted Wang
(74) *Attorney, Agent, or Firm* — Todd A. Keeler; Borden Ladner Gervais LLP

(57) ABSTRACT

Systems and methods for frequency offset estimation are provided. A channel impulse response and multi-user signal parameter are jointly estimated. Based on the multi-user signal parameter, a determination is made as to whether the signal contains a single-user signal or a multi-user signal. Then, frequency offset estimation is performed based on this determination. For example, noiseless sample estimates are generated depending on whether the signal is a single-user signal or a multi-user signal.

23 Claims, 10 Drawing Sheets

SYSTEM AND METHOD FOR FREQUENCY OFFSET ESTIMATION FOR SIGNALS CONTAINING MULTI-USER SYMBOLS

FIELD

The application relates to frequency offset estimation for signals containing multi-user symbols.

BACKGROUND

Frequency offset estimation is used to lock a local oscillator frequency of a receiver to an incoming carrier frequency through an automatic frequency control (AFC) loop. If the frequency offset estimate is unbiased and has relatively small variance, the residual frequency error will be small and has negligible impact on the error rate performance of the receiver.

The frequency offset estimation can be based, for example, on known pilot symbols (pilot-based) or detected symbols (decision-directed). For GSM (Global System for Mobile Communications) systems, the pilot symbols correspond to the 26 training symbols transmitted in the middle of every burst comprising 156 symbols. With the pilot-based scheme, the training sequence length may be too short to obtain sufficient noise averaging. The decision-directed scheme utilizes all 142 symbols (excluding 8 guard symbols and 6 tail symbols which do not belong to the payload of a burst), assuming that the symbol decisions have relatively low error rate, e.g. <2%.

VAMOS was introduced in Release 9 of the GSM standard and stands for Voice over Adaptive Multi-user on One Slot. VAMOS doubles the existing GSM network capacity by transmitting two GMSK signals in the same time and frequency. On the downlink, a base station superimposes two GMSK signals by rotating the second signal by 90 degrees relative to the first one. Without loss of generality, it is assumed that the first signal is generated from the transmitted symbol sequence x(n) intended for the user under consideration, and the second signal is generated from the transmitted symbol sequence y(n) intended for the second, interfering user. The major goal of the receiver is to detect x(n) with the minimum error rate by suppressing the interference from the second signal, which can be viewed as an internal interferer, as well as interference from external sources, for example interference from the neighboring cells using the same frequency band as the VAMOS signal. The superimposed signal is a complex-valued Alpha-quadrature phase shift keying (AQPSK) signal carrying symbols $x(n)+j\alpha y(n)$ where $\alpha$ is a parameter used to dynamically adjust the relative power levels of the two signals. In the GSM standard, this power ratio is called Sub-Channel Power Imbalance Ratio (SCPIR) where $SCPIR=20 \log(1/\alpha)$. If SCPIR is positive, more power is allocated to the first user, and if SCPIR is negative, more power is allocated to the second user. The standard specifies two receiver performance levels, VAMOS I and VAMOS II. The SCPIR value ranges from −4 to +4 dB for VAMOS-I and from −10 to +10 dB for VAMOS-II. The base station applies any SCPIR value within the range to a transmitted burst without signaling. Eight new training sequences TS-9 through TS-16 are introduced and used together with the eight legacy training sequences TS-1 through TS-8. If the first user is assigned TS-1, then the second user will be assigned TS-9, and so on. This way, each user knows both training sequences in a received AQPSK burst.

DETAILED DESCRIPTION

Figure 1:
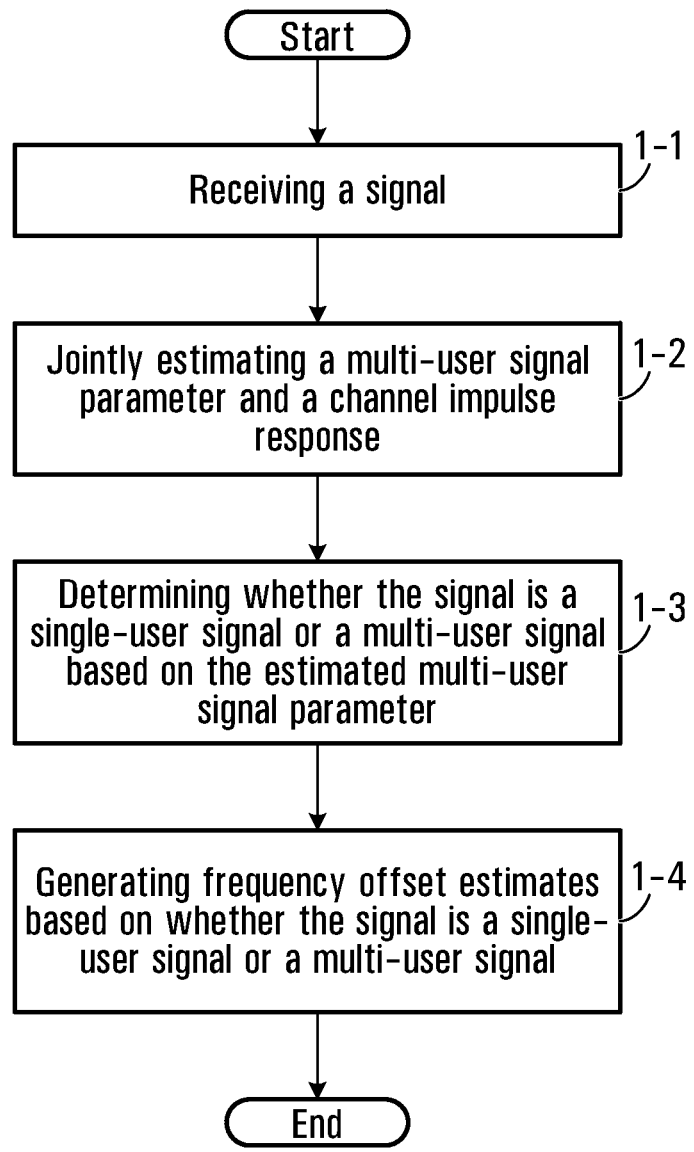
FIGS. 1 and 2 are flow charts of methods of frequency offset estimation.

A demodulator detects the transmitted symbols of the desired user x(n) with some average error rate. Many factors affect the average error rate of a demodulator, including interference and noise levels, but also frequency offset which is the difference between the frequency of the transmitted RF carrier and the frequency of the local oscillator used in the receiver to down convert the received RF signal to its baseband equivalent signal. A control system is employed in the receiver wherein the demodulator estimates the frequency offset which is used by an Automatic Frequency Control (AFC) sub-system to reduce the frequency offset. The frequency offset estimate (FOE) should be sufficiently accurate and unbiased. Inaccurate and/or biased FOE can drive the AFC loop out of lock, which may immediately render communication impossible. Even if the communication link can be maintained, large residual frequency offsets can seriously degrade the receiver performance, resulting in increased error rate of detected symbols even under otherwise good radio channel condition.

A difficulty of frequency offset estimation is to reconstruct received samples from which accurate and unbiased FOE can be derived. The reconstructed received samples are referred to as noiseless samples because the reconstruction process does not take the additive noise and interference into consideration.

The accuracy of noiseless sample estimation depends on the accuracy of channel and SCPIR estimation as well as the error rate of detected symbols of both users, not just the detected symbols of the desired user.

The accuracy of channel estimate depends on the interference suppression capability of the receiver. A VAMOS receiver is based on a Single Antenna Interference Cancellation (SAIC) algorithm which can greatly reduce interference producing a channel estimate with much interference removed. Unfortunately, after the space-time processing performed in SAIC, the phase information of the original received samples is lost and therefore the corresponding channel estimate from SAIC cannot be used to reconstruct noiseless samples. The difficulty of accurate frequency offset estimation has been confirmed through link simulations, lab tests and field trials using mobile station implementations of multiple vendors. It has been observed that the mobile stations frequently dropped calls under negative SCPIR values because the very noisy frequency offset estimates drove the AFC loop out of lock.

In an existing method, the mobile station first estimates the channel impulse response and SCPIR using the desired user's training sequence, thus treating the second user's signal as interference. After SAIC, the detected symbols of the desired user are used to estimate the noiseless samples from which the frequency offset is estimated.

If the SCPIR estimate from the first demodulation is negative, indicating that the power level of the second user signal is probably stronger than the power level of the signal of the first user signal, the receiver demodulates the burst again, but using the training sequence of the second user, and treating the first user as interference. The symbol decisions of the second user are used to reconstruct the noiseless samples from which the final frequency offset is estimated.

A broad aspect of the disclosure provides a method in a device, the method comprising: receiving a signal; estimating a multi-user signal parameter and a channel impulse response; determining whether the signal is a single-user signal or a multi-user signal based on the estimated multi-user signal parameter; generating frequency offset estimates based on whether the signal is a single-user signal or a multi-user signal.

Another broad aspect of the disclosure provides a demodulator comprising: a channel and multi-user signal parameter estimator that estimates a multi-user signal parameter and a channel impulse response from a received signal; a burst type detector that determines whether the signal is a single-user signal or a multi-user signal based on the estimated multi-user signal parameter; a frequency offset estimator that generates frequency offset estimates based on whether the signal is a single-user signal or a multi-user signal.

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/ executable instructions that may be stored or otherwise held by such computer readable storage media.

FIG. 1 is a flowchart of a method of frequency offset estimation for execution in a receiver. The method begins in block 1-1 with receiving a signal. Block 1-2 involves jointly estimating a multi-user signal parameter value and a channel impulse response. In block 1-3, a determination is made of whether the signal is a single-user signal or a multi-user signal based on the estimated multi-user signal parameter value. In block 1-4, frequency offset estimates are generated based on whether the signal is a single-user signal or a multi-user signal.

Figure 2:
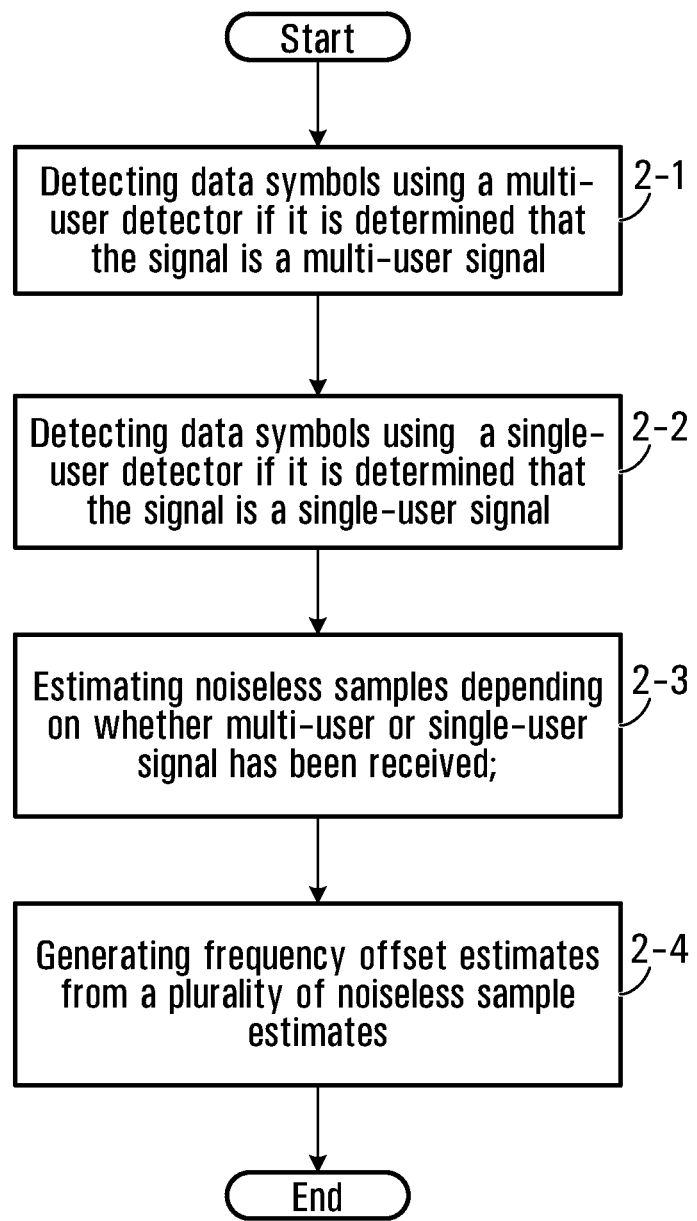

FIG. 2 is a flowchart of an example method of generating frequency offset estimates based on whether the signal is a single-user signal or a multi-user signal. In block 2-1, data symbols are detected using a multi-user detector if it is determined that the signal is a multi-user signal, and in block 2-2, data symbols are detected using a single-user detector if it is determined that the signal is a single-user signal. In block 2-3, noiseless samples are estimated depending on whether a multi-user or a single-user signal has been received. Finally, in block 2-4, frequency offset estimates are generated from a plurality of noiseless sample estimates.

Figure 3:
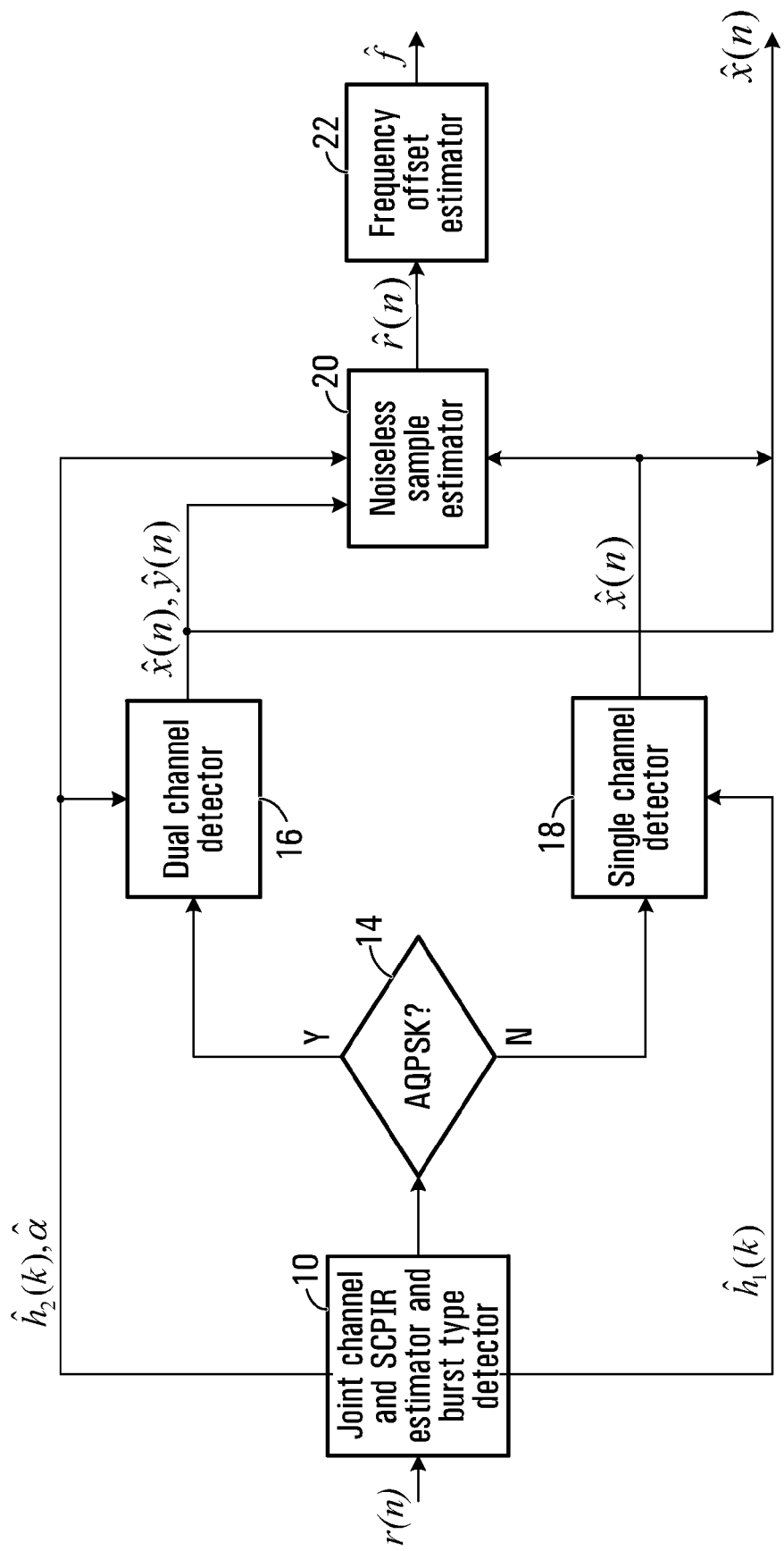
FIG. 3 is a block diagram of a signal demodulator configured to perform frequency offset estimation.

A block diagram of a signal demodulator is depicted in FIG. 3. This signal demodulator is an example of a signal demodulator that can implement the method of FIG. 1, or the methods of FIG. 1 and FIG. 2.

Shown in FIG. 3 are a joint channel and SCPIR estimator, and burst type detector 10 that processes incoming samples r(n) to produce a channel impulse response $\hat{h}_2(k)$, an estimate of a multi-user signal parameter, and a burst type output. In the event a single user burst is detected, the joint channel and SCPIR estimator and burst type detector 10 also generates a channel impulse response $\hat{h}_1(k)$ based on a training sequence of the single user. The burst type output is output to a decision block 14 which has a yes path which is active when a multi-user signal is detected, and a no path which is active when a single user signal is detected. In the illustrated example and the remaining of this description, AQPSK is used for a multi-user signal and GMSK is used for single user signal, but other modulation schemes may be employed Shown is a dual channel multi-user detector 16 connected to receive $\hat{h}_2(k)$, and the estimate $\hat{\alpha}$ of the SCPIR. The output of the multi-user detector 16 is a pair of signal estimates $\hat{x}(n)$ and $\hat{y}(n)$. These are passed to a noiseless sample estimator 20 which also receives $\hat{h}_2(k)$, and the estimate $\hat{\alpha}$. Also shown is a single user detector 18 connected to receive $\hat{h}_1(k)$. The output of the single-user detector 18 is the detected symbol of the intended user $\hat{x}(n)$. This is also passed to the noiseless sample estimator 20. The noiseless sample estimator 20 produces noiseless sample $\hat{r}(n)$, which is input to a frequency offset estimator 22, the output of which is a frequency offset estimate $\hat{f}$. Irrespective of whether it is an AQPSK burst or a GMSK burst, it is assumed that $\hat{x}(n)$ is the signal that the particular receiver is interested in.

The received signal sample r(n) is either an AQPSK sample or a GMSK sample. A received AQPSK signal sample r(n) is modeled as $$(n) = \left\{\sum_{k=0}^{L-1} h(k)(x(n-k) + j\alpha y(n-k))\right\} e^{j2\pi f_n T_s} + q(n) + v(n) \quad (1)$$

$$= C e^{j2\pi f_n T_s} + q(n) + v(n)$$

A received GMSK signal sample r(n) is modeled as $$r(n) = \left\{\sum_{k=0}^{L-1} h(k)(x(n-k))\right\} e^{j2\pi f_n T_s} + q(n) + v(n) \quad (2)$$

$$= C e^{j2\pi f_n T_s} + q(n) + v(n)$$

In the formulas, h(k), q(n) and v(n) are the L taps of the channel impulse response, external interference and thermal noise, respectively. Due to the frequency offset f, the signal term of each sample has a phase rotation of $2\pi f n T_s$ where $T_s$ is the symbol interval.

In the illustrated example, it is assumed here and in the remainder of this description that the multi-user signal parameter is $\hat{\alpha}$, or the SCPIR, but some other metric that reflects the relative power of two or more user's signals may be employed as well. For example, in some embodiments, more than two user signals are superimposed in one received signal. For example, 16-quadrature amplitude modulation (QAM) can be used to include 4 user signals in which case 3 independent multi-user parameters are needed to specify the relative power levels of the individual user signals.

Joint Channel and SCPIR Estimation

In operation, the joint channel and SCPIR estimator 10 jointly estimates the channel impulse response $\hat{h}_2(k)$ and the SCPIR, for example using one of the methods referred to below, and also detects whether the signal is a single-user signal or a multi-user signal. This can for example involve detecting the burst type, i.e. whether a GMSK or AQPSK burst is being received. The burst type detection can, for example, be made based on the estimated value of SCPIR. In some embodiments, a SCPIR value that is larger than a threshold is used as an indication that a GSMK burst has been received. An example of such a threshold is 100 dB but other large thresholds can alternatively be used. The burst type indication is used by the decision block 14 to control whether to perform dual channel detection or single channel detection.

It is noted while in the embodiments described, it is assumed that the channel impulse response and multi-user signal parameter are jointly estimated, more generally, estimates of the channel impulse response and the multi-user signal parameter are made using a method that may or may not involve joint estimation. For example, the channel impulse response and the multi-user signal parameter may be independently estimated.

If a single-user signal is detected, the receiver estimates the channel impulse response $\hat{h}_1(k)$, using the training sequence of the intended user. This is performed because the channel estimate produced by the joint channel and SCPIR estimator 10 is poor if in fact the signal was a single user signal. A channel estimate based on the training sequence of the intended user will typically be more accurate. This channel estimate is for use in performing single channel detection, and by the noiseless sample estimator.

If an AQPSK burst is detected, the channel estimate from the joint channel and SCPIR estimation is used by the dual channel detector.

Signal Detection

After the impulse response estimation based on reception of a single-user signal (e.g. GMSK bursts), the received burst r(n) and impulse response estimate $\hat{h}_1(k)$ are passed to the single channel detector 18. This may, for example consist of a SAIC unit and a Viterbi equalizer.

After the channel estimation, for a multi-user signal (e.g. AQPSK bursts), a pair of detected symbol sequences $\hat{x}(n)$ and $\hat{y}(n)$ are generated by the multi-user detector 16. Even though the receiver is not ultimately interested in the symbols of the second user, where dual channel detection is employed, the receiver attempts to generate a good estimate of $\hat{y}(n)$ for the second user's symbol. This is because the accuracy of frequency offset estimation depends on the error probability of detected symbols for both users.

The channel estimate $\hat{h}_2(n)$, the SCPIR estimate $\hat{\alpha}$ and the received burst r(n) are passed to the multi-user detector to detect the transmitted symbols of both users $\hat{x}(n)$ and $\hat{y}(n)$. The multi-user detector can be implemented, for example, as a joint-maximum likelihood sequence estimation (J-MLSE) Viterbi equalizer, or a successive interference cancellation (SIC) unit.

The J-MLSE jointly demodulates the symbols of both users, using an AQPSK constellation, whereas SIC first demodulates the symbols of the stronger user, removing the contribution of the stronger user and then demodulates the symbols of the other user after the interference removal.

In an example of a SIC-based implementation, the receiver adaptively detects the two symbol streams in order to minimize the error probability of both symbol streams. For example, if SCPIR estimate is less than a threshold of say −2 dB, the receiver first demodulates the second user's signal, performs SIC, and then demodulates the desired user's symbols. If, on the other hand, the SCPIR estimate is above another threshold of say +2 dB, the receiver first demodulates the desired user's symbols, performs SIC and then demodulates the second user's symbols. Finally, if the SCPIR estimate is larger than −2 dB, but smaller than +2 dB, the receiver demodulates the two symbol streams independently, without SIC operation in between.

An objective of using multi-user detection in the context of carrier recovery is to reduce the error rate of the detected symbols for both users, not only the error rate of the detected symbols for the intended user. This is because the accuracy of noiseless sample estimates and thus the frequency offset estimate depends on the symbol error rate of both users, not just the symbol error rate of the desired user.

For example, if the SCPIR estimate is 3 dB, then the desired user signal power level is two times as large as the second user signal. A conventional demodulator would just demodulate the intended user's symbols and then the job is done. In some embodiments, instead of the conventional approach, a method is used in which the detected symbols of the desired user are used to reconstruct the desired user's signal, and in which the result is subtracted from the received signal, to remove the interference from the desired signal to the second user signal. Afterwards, the difference signal is demodulated to detect the symbols of the second user. Since the interference from the first user's signal is removed, the error rate of the detected symbols for the second user can be significantly reduced which leads to more accurate frequency offset estimate.

On the other hand, the method can involve first demodulating the second user's signal if the SCPIR estimate is below a threshold, reconstructing the second user's signal using channel and SCPIR estimate and the detected symbols of the second user as inputs; subtracting the reconstructed signal from the received signal; demodulating the difference signal to detect the symbols of the intended user.

Noiseless Sample Estimation

The values of received signals depend on several variables, including channel, transmitted symbols, $\alpha$, sample timing, frequency offset, noise and interference. A so-called noiseless sample is obtained by convolving detected symbols, which can be either AQPSK or GMSK symbols, with the estimated channel impulse response. The noiseless samples can then be used to solve for the frequency offset as detailed below. If all the estimates were to be perfect and there were no noise and interference, then the resulting frequency offset estimate would be exact. In practice, however, all these estimated and detected quantities are only approximations of the true values due to the unavoidable estimation noise. In addition, there is always additive noise and interference. Even if the estimated values were perfectly exact, a frequency offset estimate sample is still quite noisy due to noise. The more accurate the noiseless sample estimates are, the more accurate the frequency offset estimates will be.

On the other hand, even if there were no noise, the accuracy of noiseless samples are greatly impacted by the accuracy of estimated channel, transmit symbols, $\alpha$, etc.

The noiseless sample estimator 20 generates noiseless samples $\hat{r}(n)$ based on whether a single user signal was detected or a multi-user signal was detected. For a single user signal, (e.g. GMSK burst), noiseless samples are reconstructed from the detected symbols of the desired user alone i.e. based on $\hat{x}(n)$, whereas for a multi-user signal (e.g. AQPSK burst), noiseless samples are reconstructed from the detected symbols of both the desired user and the second user, i.e. based on $\hat{x}(n)$ and $\hat{y}(n)$.

For AQPSK symbols, noiseless samples $\hat{r}(n)$ are calculated by convolving the detected AQPSK symbols $\hat{x}(n-k)+j\hat{\alpha}\hat{y}(n-k)$ with the channel impulse response $\hat{h}_2(k)$ determined during the joint detection of SCPIR and the channel:

$$\hat{r}(n) = \sum_{k=0}^{L-1} \hat{h}_2(k)(\hat{x}(n-k) + j\hat{\alpha}\hat{y}(n-k)) \quad (3)$$

For GMSK symbols, noiseless samples $\hat{r}(n)$ are calculated by convolving the detected GMSK symbols $\hat{x}(n-k)$ with the channel impulse response $\hat{h}_1(k)$ determined based on the training sequence of the desired user:

$$\hat{r}(n) = \sum_{k=0}^{L-1} \hat{h}_1(k)\hat{x}(n-k) \quad (3)$$

It can be seen that the reconstructed noiseless samples are based only on the channel estimates and detected symbols, and do not include terms for interference, thermal noise, and frequency offset that are present in the actual received samples r(n).

Frequency Offset Estimation

With perfect channel and SCPIR estimation and symbol detection, the product between the conjugate of $\hat{r}(n)$ (noiseless sample based on AQPSK symbol for dual channel case or GMSK symbol for single channel case) and the received samples r(n) becomes:

$$\hat{r}(n)^*r(n) = C^*(Ce^{j2\pi f_n T_s} + q(n) + v(n)) \quad (5)$$
$$= |C|^2 e^{j2\pi f_n T_s} + C^*q(n) + C^*v(n)$$

It can be seen that, in perfect conditions, the frequency offset estimate is:

$$\hat{f}(n) = \frac{\angle(\hat{r}(n)^*r(n))}{2\pi n} \quad (6)$$

where $\angle(x)$ is the angle in radians of a complex value x.

While the frequency offset includes components due to interference and noise, in practice, the interference and noise can be assumed to have zero mean and relatively small magnitude when compared to the AQPSK and can thus be averaged out over many $\hat{f}(n)$ samples. In order to make accurate frequency offset estimate, in some embodiments, many frequency offset sample are calculated and then averaged to suppress the noise.

For example, in some embodiments the frequency offset is determined for each of the symbols of a burst, and then averaged to generate an overall frequency offset estimate. This provides more robust frequency offset estimation in a wireless environment with high mobility, fast fading and strong interference. In a specific example, assuming the burst is a VAMOS burst, a received burst consists of 148 transmitted symbols including 26 known pilot symbols and 122 unknown symbols. Frequency offset estimation can be based on an average of estimates determined for all 148 symbols.

Figure 4:
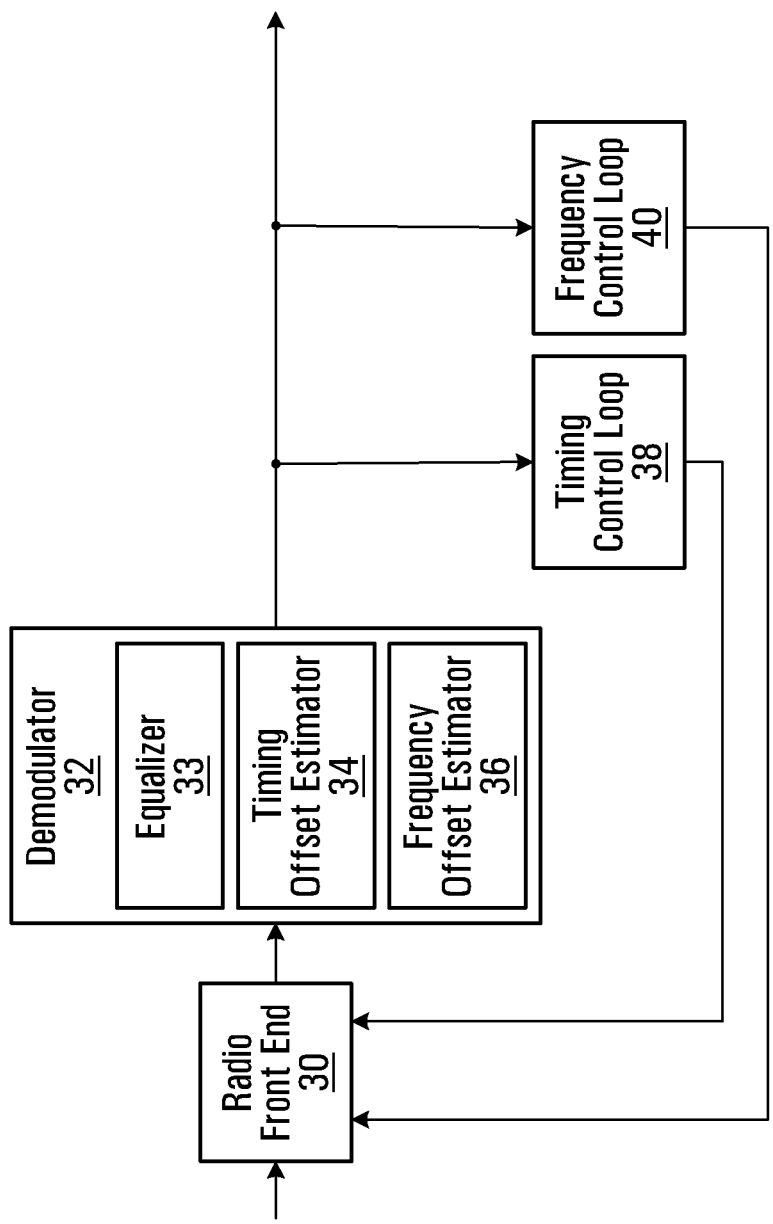
FIG. 4 is a block diagram of a device including the demodulator of FIG. 3.

FIG. 4 is a block diagram of a device, for example a mobile device, within which the functionality of the demodulator of FIG. 3 may be implemented. Shown is a radio front end 30 connected to a demodulator 32. The demodulator has an equalizer 33, a timing offset estimator 34 and a frequency offset estimator 36. The functionality of the receiver of FIG. 3 can be used to implement the frequency offset estimator, although some of the same functionality may implement other parts of the receiver of FIG. 4. An output of the demodulator 32 is input to a timing control loop 38 which in turn has an output that is input to the radio front end 30. Similarly, an output of the demodulator 32 is input to a frequency control loop 40 which in turn has an output that is input to the radio front end 30.

In operation, the device attempts to demodulate a received signal while keeping synchronization with the transmitter in the time and frequency domains using control loops 38, 40. For synchronization, the device continuously estimates the time and frequency offset which is used by the control loops 38, 40 in the receiver to reduce the actual time and frequency offset by adjusting the timing of sampling and by changing the frequency of the local oscillator so that the residual time and frequency offset are kept within a reasonably small limit.

A received burst may, for example consist of 148 transmitted symbols including 26 known pilot symbols, 116 unknown symbols and 6 tail symbols with known values. Frequency offset estimation can be based on pilot symbols or all symbols. The former method is called pilot based and later method is called decision-directed which means that the demodulated symbols are used to estimate frequency offset. The pilot based method has the advantage that the pilot symbols are known, but suffers from the noise effect because there are only 26 such symbols to average over.

Performance Analysis

Methods of providing accurate frequency offset estimation even in the presence of strong interference from the second user (e.g. SCPIR=−4 dB) are provided. Furthermore, these methods may also improve the error rate performance of the receiver. This can be explained using the following VAMOS signal model in which the first term is the desired user signal, the second term is the second user's signal and the last term is the external interference:

$$r(n) = e^{j2\pi f_n T_s} \sum_{k=0}^{L-1} h(k)(x(n-k) + e^{j2\pi f_n T_s} \sum_{k=0}^{L-1} j\alpha h(k)y(n-k) + q(n) \quad (7)$$

Let $C_1$, $C_1$ be the signal levels of the first and second signal, respectively and let I be the signal level of the external interference $q(n)$. Consider a VAMOS-I case in which SCPIR=−4 dB and Carrier-to-Interference Ratio or C/I=10 dB, then $C_2 = \sqrt{4C_1} = 2C_1$, $C = C_1 + C_2 = 3C_1$, $$I = \frac{C}{\sqrt{10}} = \frac{3C_1}{\sqrt{10}}$$

If only the desired user's signal is used for channel and SCPIR estimation, then the mean effective SNR is:

$$20 * \log_{10}\left(\frac{C_1}{C_2 + I}\right) = \quad (8)$$
$$20 * \log_{10}\left(\frac{C_1}{(2 + 3/\sqrt{10})C_1}\right) = 20 * \log_{10}\left(\frac{1}{2 + 3/\sqrt{10}}\right) = -9.4 \text{ dB}$$

If only the second user's signal is used for channel and SCPIR estimation, then the mean effective SNR is 0.23 dB which is still too low to have acceptable estimation quality:

$$20 * \log_{10}\left(\frac{C_2}{C_1 + I}\right) = \quad (9)$$
$$20 * \log_{10}\left(\frac{2C_1}{(1 + 3/\sqrt{10})C_1}\right) = 20 * \log_{10}\left(\frac{2}{1 + 3\sqrt{10}}\right) = 0.23 \text{ dB}$$

On the other hand, if both signals are used for the channel and SCPIR estimation, then the mean effective SNR is 10 dB for this test case which gives much more accurate channel estimation.

Figure 5:
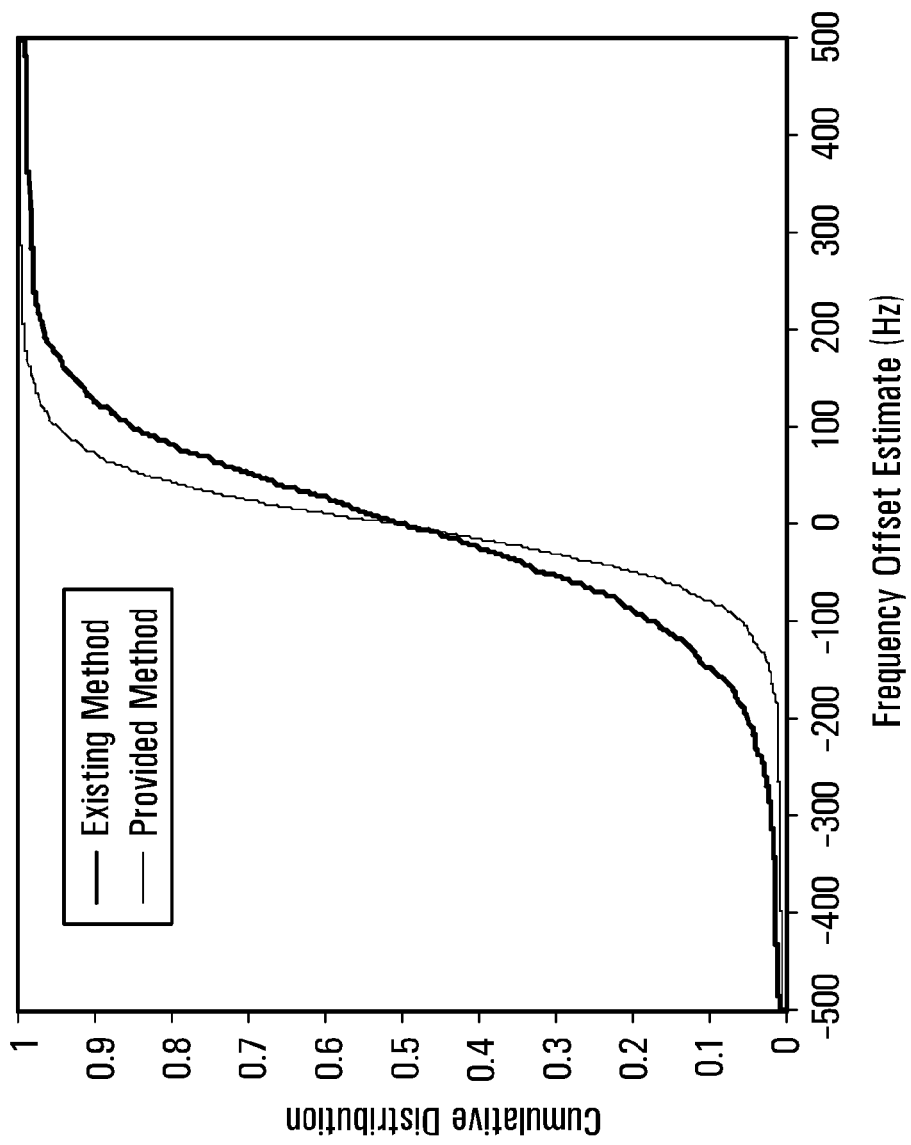
FIGS. 5, 6 and 7 show example performance results.
Figure 6:
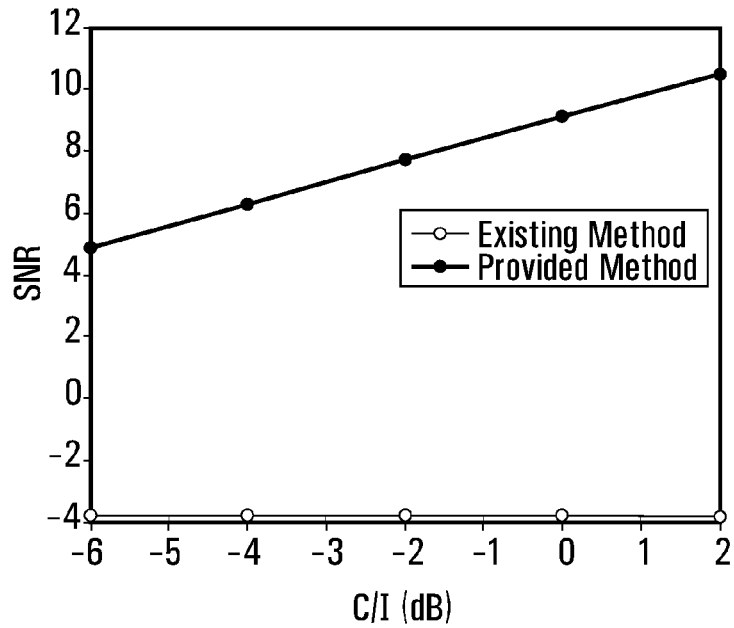
Figure 7:
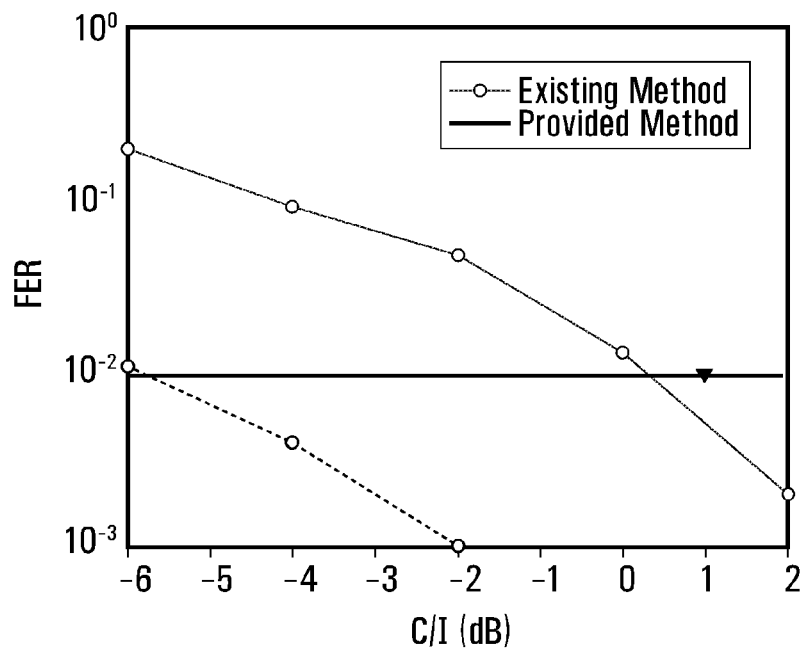

FIGS. 5 to 7 compare the simulation results obtained using a method as described above with reference to FIG. 1 and the existing method referred to above, respectively, using a 3GPP VAMOS-I type approval test VDTS-4. In this test case, the SCPIR is −4 dB and there is an external adjacent channel interferer in addition to the interference from the second user. The true frequency offset is set to 0 Hz.

FIG. 5 compares the cumulative distribution of frequency offset estimates using the existing method and the method provided herein. It can be seen that the frequency offset estimates using the provided method are much more concentrated around the true frequency offset which is 0 Hz.

FIG. 6 shows the effective SNR that the receiver experienced during the channel and SCPIR estimation. It can be seen that the SNR using the provided method increases with the overall C/I from 5 dB to more than 10 dB whereas the SNR using the existing method stays around −4 dB, independent of the overall C/I, even though the receiver also demodulates the signal twice.

Finally, FIG. 7 shows the Frame Error Rate (FER) results. It can be seen that the provided method improves the performance by about 6 dB at 1% FER reference performance, even though the provided method may have approximately the same computational complexity as the existing method.

Joint Channel and SCPIR Estimation

The following is an example of a method that can be employed to perform joint channel and SCPIR estimation.

A problem is that the receiver may not know the multi-user signal parameter (e.g. SCPIR) which can take any value, possibly subject to a range constraint, for example between −10 dB and +10 dB. This may complicate the channel estimation because it is difficult for the receiver to estimate the channel without knowing the SCPIR, and vice versa. Using an inaccurate SCPIR to estimate CIR (channel impulse response) can cause large CIR estimation error. Using inaccurate CIR in the subsequent processing can greatly degrade the overall receiver performance.

An existing method of SCPIR estimation is published in 2009 PIMRC "Efficient Receivers for GSM MUROS Downlink Transmission", by R. Meyer, et al., and it is based on a maximum likelihood (ML) formulation of the VAMOS channel estimation problem which can be expressed in matrix-vector form as:

$$r = A_1 h + \alpha A_2 h + n + q \quad (10)$$

where $A_1$ and $A_2$ are $(N-q_h) \times (q_h+1)$ convolution matrices (N=26 is the length of a training sequence, $q_h$ is the channel memory length) for the first and second training sequence, respectively (note the factor j, which is used to perform 90-degree rotation on the second signal, is absorbed in $A_2$), h is a $(q_h+1)$ vector of channel taps, r, n and q are $(N-q_h)$ column vectors containing received signal, thermal noise and other cell interference samples, respectively, over the training sequence.

The CIR estimate h according to the known method is given by:

$$\hat{h} = (A_1^H + \hat{\alpha} A_2^H)(A_1 + \hat{\alpha} A_2))^{-1}(A_1 + \hat{\alpha} A_2^H)r \quad (11)$$

The estimate for $\hat{\alpha}$ is given by:

$$\hat{\alpha} = \frac{1}{2}(\hat{h}^H A_2^H A_2 \hat{h})^{-1}\{(\hat{h}^H A_2^H)(r - A_1 \hat{h}) +))r^H - \hat{h}^H A_1^H)$$
$$A_2 \hat{h})\} \quad (12)$$

There is no closed form solution to $\hat{h}$ and $\hat{\alpha}$. Therefore, CIR and SCPIR must be solved iteratively, by inserting an initial $\hat{\alpha}$ into Equation 11 to get an initial $\hat{h}$ which is then used to refine $\hat{\alpha}$ using Equation 12 and so on, until the solution converges. This method has two major disadvantages.

Firstly, the computation load is very high. Even though $A_1$ and $A_2$ are both known a priori, the quantities $\hat{\alpha} A_2$, $A_1 + \hat{\alpha} A_2$ and especially the nontrivial matrix inverse $((A_1^H + \hat{\alpha} A_2^H)(A_1 + \hat{\alpha} A_2))^{-1}$ must be re-computed for every different $\hat{\alpha}$. Our calculation shows that Equation 11 and Equation 12 for a single $\hat{\alpha}$ value require approximately 23,300 math operations, not including additional overhead for fixed-point implementation such as scaling. Assume 10 iterations are needed, the number of operations totals 233,000 which are prohibitively high, considering that the channel estimation represents only a relatively small part of a VAMOS-II receiver. In addition to high power consumption, the high computation load also limits the estimation accuracy because it is too expensive to run additional iterations.

Secondly, the ML algorithm for VAMOS application degrades the performance because the statistics of other cell interference is not white Gaussian. This fact has been confirmed through link simulations.

An embodiment of the application provides a method of jointly estimating the channel impulse response and the multi-user signal parameter.

The approach is based on the following points. The first point is that cross-correlation may provide a better solution to the VAMOS channel estimation problem than the ML or Least-Squares (LS) because it does not require re-computing the whole matrices each time a different $\hat{\alpha}$ is used. In addition, a cross-correlation method may lead to more accurate estimation in VAMOS where other cell interference dominates.

The second point is that once the CIR estimate $\hat{h}$ is computed for an $\hat{\alpha}$, the CIR estimate can be used to predict what a received signal sample in the training sequence region should be. The predicted sample is then subtracted from the corresponding received sample. If the $\hat{\alpha}$ is correct, the resulting error is mainly the noise and other cell interference. However, if $\hat{\alpha}$ deviates from the $\alpha$ significantly, the error signal magnitude will be much larger. It will be shown that the minimum squared error (MSE) is a concave function of $\alpha-\hat{\alpha}$ which has only a single minimum value.

The third point is to utilize the concave property of the MSE function. For example, an initial $\hat{\alpha}$ can be chosen, used to estimate CIR and to then calculate the MSE. These steps are repeated to calculate MSE for $\hat{\alpha}+D$ and $\hat{\alpha}-D$. If the two MSEs are both larger than the MSE for $\hat{\alpha}$, then a must be located between $\hat{\alpha}-D$ and $\hat{\alpha}+D$. Then the MSEs are calculated corresponding to $\hat{\alpha}-d$ and $\hat{\alpha}+d$ where d<D. For example, D and d can correspond to an increment of 2 dB and 1 dB SCPIR, respectively. In this way, a relatively small number of iterations are required to obtain accurate results, for example, within 0.5 dB SCPIR resolution.

The following provides a detailed example of such a method. For presentational clarity, an assumption is made that the channel is a flat fading channel, i.e. there is a 1-tap CIR, to illustrate the approach. The methods are then extended to the frequency selective fading. Since channel estimation is performed over the training sequence, $t_1(n)$ and $t_2(n)$ are used to represent a known training symbol for the first and second users respectively. Furthermore, if only one symbol is considered, index n is omitted.

A transmitted training sequence symbol can be expressed as $$s = \frac{1}{\sqrt{P_t}}(t_1 + j\alpha t_2)$$

where $P_t$ is the transmit power given by $P_t = t_1^2 + \alpha^2 t_2^2 = 1+\alpha^2$ (note $t_1, t_2 \in (-1, +1)$). Assume fading is flat, the CIR has one tap h so the received signal corrupted by noise w is given by $$r = \frac{h}{\sqrt{P_t}}(t_1 + j\alpha t_2) + w.$$

The receiver estimates h and $\alpha$ given observation r, by generating a local transmit signal $$t = \frac{1}{\sqrt{P_t}}(t_1 + j\hat{\alpha} t_2)$$

and then cross-correlates r with $t(\hat{\alpha})$ to get $C_{rt}$:

$$C_{rt} = r * conj(t) = \frac{h}{P_t}\{(1+\alpha\hat{\alpha}) + j(\alpha - \hat{\alpha})\} + w \quad (13)$$

Observe that if $\alpha=\hat{\alpha}$, the cross-correlation is the actual channel tap plus noise:

$$C_{rt} = \frac{h}{P_t}(1+\alpha^2) + w = h + w \quad (14)$$

Since w is zero mean noise, the channel estimate is unbiased, i.e. $E(C_{rt})=h$. Here, we just cross-correlate one signal sample with the local transmit symbol. Since a GSM burst has 26 training sequence symbols, the receiver correlates 26 samples and takes the average of the correlation sum, resulting in a processing gain of 26 and suppressing noise by a factor of 26.

If $\alpha \neq \hat{\alpha}$, there will be an estimation bias, and the magnitude of the bias depends on the difference $\alpha-\hat{\alpha}$. For example, if $\alpha=1$ and $\hat{\alpha}=0.79$, the resulting channel estimate becomes:

$$\hat{h} = C_{rt} = \frac{h}{P_t}\{(1+\alpha\hat{\alpha}) + j(\alpha - \hat{\alpha})\} + w = \frac{h}{P_t}(1.79 + 0.21j) + w \quad (15)$$

Due to $\alpha \neq \hat{\alpha}$ the estimated channel is both scaled and phase rotated by the complex number $(1+\alpha\hat{\alpha})+j(\alpha-\hat{\alpha})$. The larger the difference $\alpha-\hat{\alpha}$, the larger the channel estimation error becomes.

Once $\hat{h}$ is calculated, we use it to reconstruct a predicted received signal $\hat{h}t$ and subtract it from the corresponding received signal r to generate error signal e:

$$e = r - \hat{h}t = \frac{h}{\sqrt{P_t}}(t_1 + j\alpha t_2) - \frac{\hat{h}}{\sqrt{P_t}}(t_1 + j\hat{\alpha} t_2) + w \quad (16)$$

Figure 8:
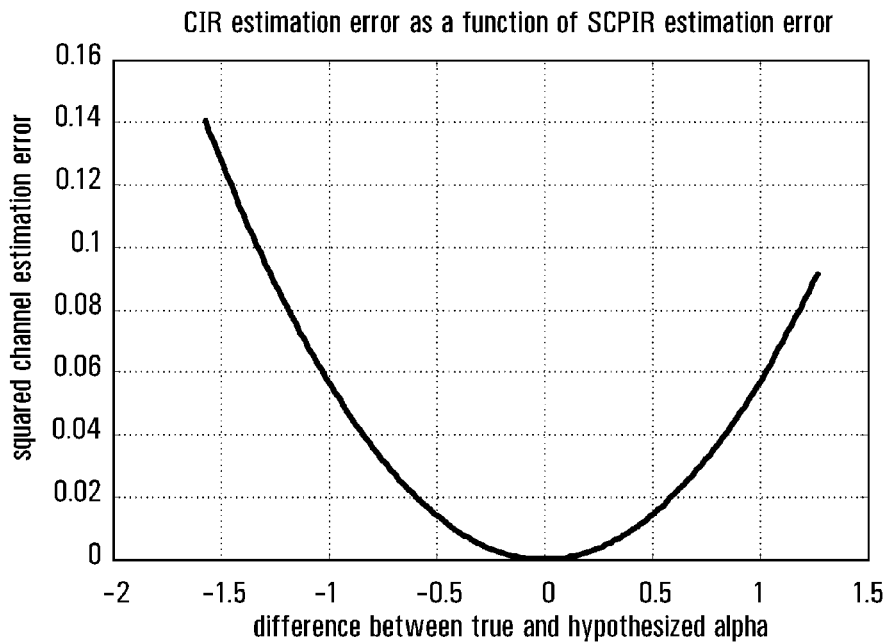
FIG. 8 shows squared estimation error $|e|^2$ as a function of $\alpha - \hat{\alpha}$ in the absence of channel noise and interference.

Ignoring white noise and interference, it can be seen that the error is zero if $\alpha=\hat{\alpha}$. FIG. 8 shows squared estimation error $|e|^2$ as a function of $\alpha-\hat{\alpha}$ in the absence of channel noise and interference. It can be seen that the error is zero if $\alpha=\hat{\alpha}$, but increases fast as absolute value of $\alpha-\hat{\alpha}$ becomes larger. Furthermore, the error curve is concave which means that it has only a single minimum value at $\alpha-\hat{\alpha}=0$.

Figure 9:
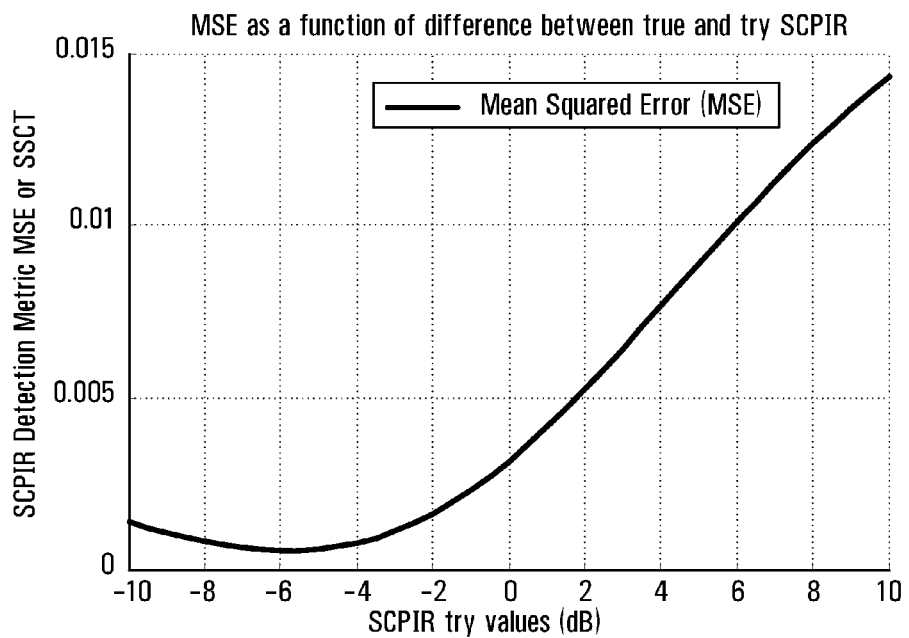
FIG. 9 shows a MSE curve obtained from a realistic simulation where the channel has 5 taps and the received signal is impaired by both white noise and interference.

FIG. 9 shows a MSE curve obtained from a realistic simulation where the channel has 5 taps and the received signal is impaired by both white noise and interference. In this scenario, the base station transmits bursts using SCPIR=-5 dB and the MSE curve calculated based on the inventive channel estimator is also concave and reaches its minimum at close to -5 dB SCPIR.

For frequency selective fading, the receiver estimates multiple channel taps by computing $2q_h+1$ cross-correlations in a sliding window and then extracts $q_h+1$ taps from the correlations:

$$C_{rt}(k, \hat{\alpha}) = \sum_{n=Q}^{N-Q} r(P+k+n)conj\{t(n)\} \quad (17)$$

$$k = 0, 1, 2, \ldots 2q_h$$

where k is cross-correlation functions lag, P is the correlation starting index and Q is the number of training symbols to be skipped at the beginning and end of the training sequence to achieve the perfect correlation properties. The optimum k is then determined $$\hat{k} = \underset{k}{\operatorname{argmin}} \sum_{k=0}^{W-1} \left\{ \left| r(P+k) - \sum_{m=0}^{q_h} C(k, \hat{\alpha}) t(Q+k-m) \right| \right\}^2 \quad (18)$$

Finally, the channel estimate is given by:

$$\hat{h}(l) = C_{rt}(\hat{k}+l, \hat{\alpha}), l=0,1,2,\ldots 2q_h \quad (19)$$

Figure 10:
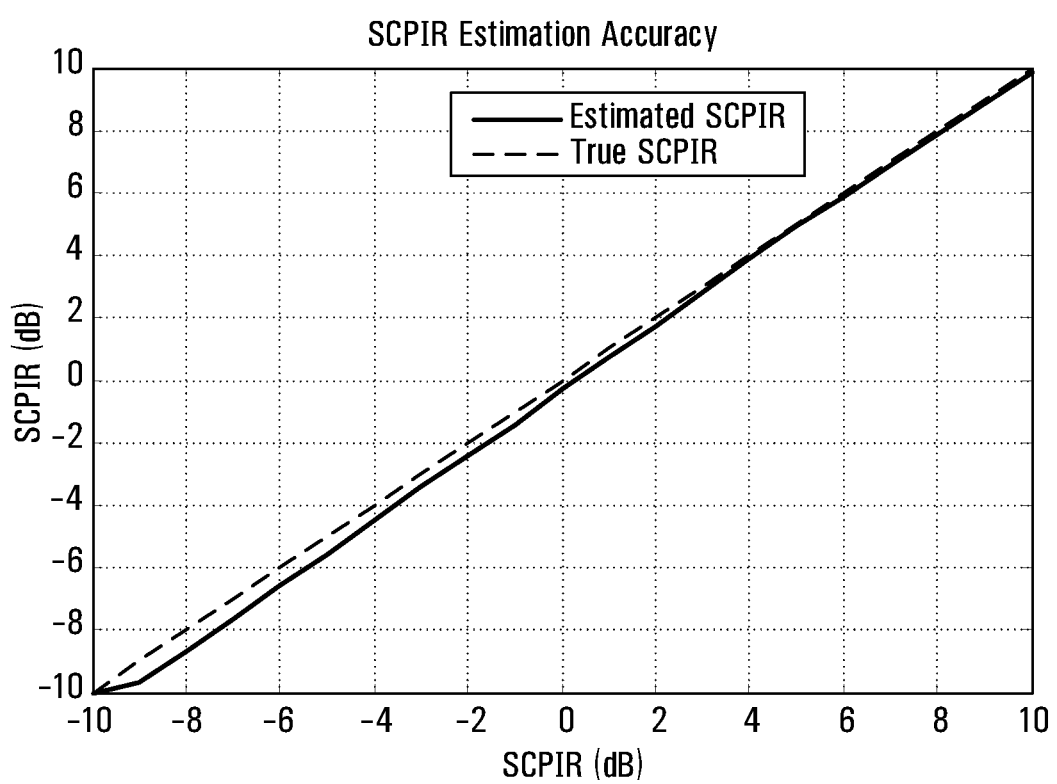
FIG. 10 plots the average estimated SCPIR (solid line) against the true SCPIR (broken line)

The provided approach can be used for VAMOS channel estimation algorithm and can be shown to achieve very accurate estimation results. FIG. 10 plots the average estimated SCPIR (solid line) against the true SCPIR (broken line). In this case, the base station transmits bursts using SCPIR from −10 dB to +10 dB in 1 dB increment. The receiver estimates both the channel and SCPIR using the channel estimator and a 2 dB and 0.5 dB SCPIR search increment.

It can be seen that at very low SCPIR, the estimated SCPIR deviates from the true SCPIR by less than 0.5 dB. However, as SCPIR increases, the estimated SCPIR gets very close to the true SCPIR.

The provided approach requires approximately 1000 operations for each iteration. With 10 iterations, the total number of operations is thus 10,000, much less than 233,000 operations when using the existing method.

Finally, the provided algorithm is much easier to implement. Instead of computing matrix inverse, which is a non-trivial task in fixed point implementation, only straightforward multiplication and accumulation (MAC) operations are needed.

Figure 11:
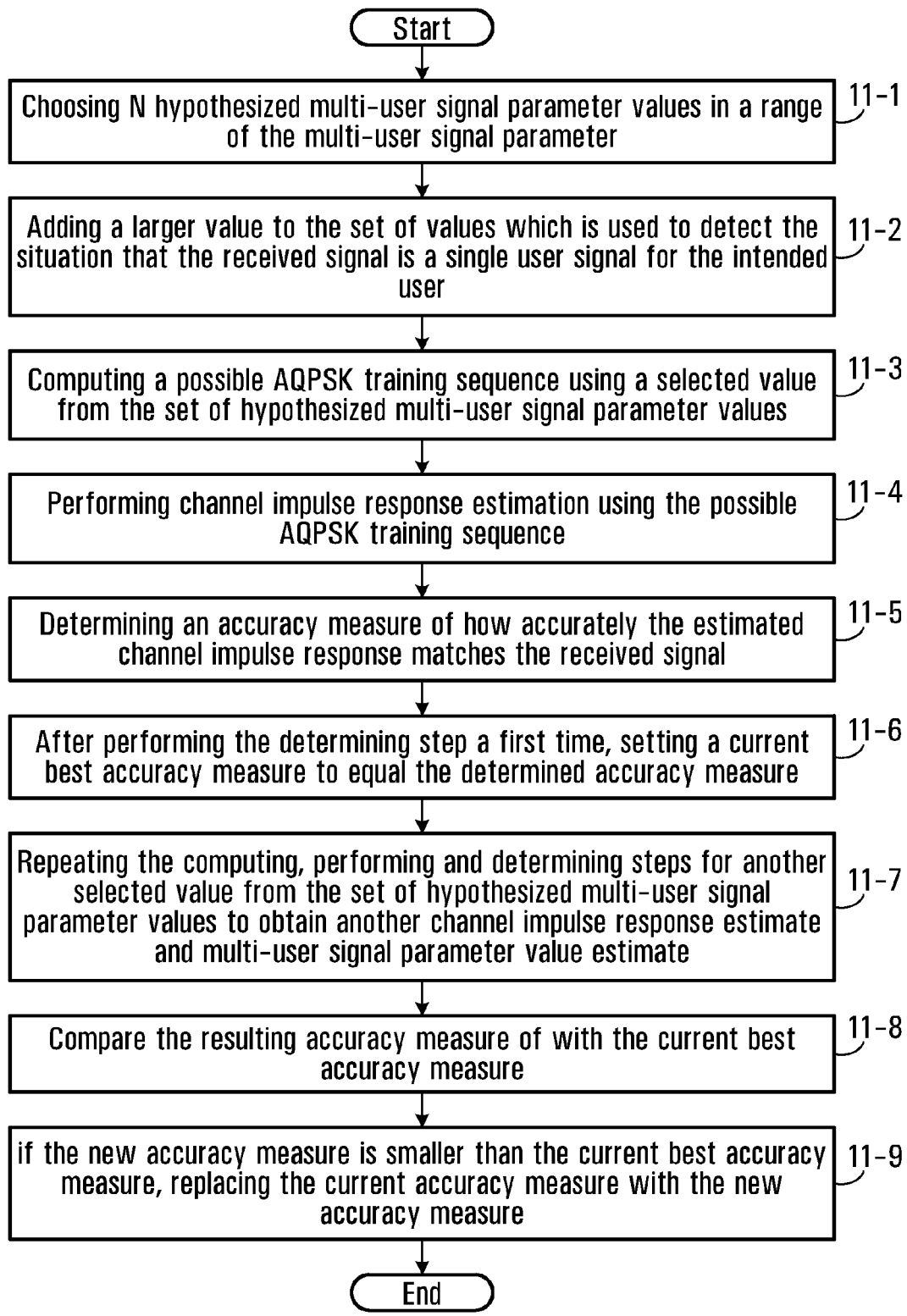
FIG. 11 is a flowchart of a method of joint multi-user channel parameter and channel impulse response.

Referring now to FIG. 11, shown is a flowchart of a method for execution in a device, such as a mobile device, for jointly estimating α and the channel impulse response. The method begins in block 11-1 with choosing N hypothesized multi-user signal parameter values in a range of the multi-user signal parameter. For example, if the range is from [−4 +4] dB, then N=9 values −4, −3, ... 0, ... +3, +4 values can be chosen. The smaller the distance between consecutive values, the more accurate the estimation, but also the more computations are required. The method continues in block 11-2 with adding a larger value to the set of values which is used to detect the situation that the received signal is a GMSK signal for the intended user. If this use case is not of interest, this step can be omitted. For example, 20 dB can be used so that the set of values of possible multi-user signal parameter values becomes [−4, −3, ... 0, ... +3, +4, +20]. The 20 dB represents the situation when the power level of the first signal is 100 times larger than the power level of the second user, making the received signal practically a single user signal. The method continues in block 11-3 with computing a possible AQPSK training sequence using a selected value from the set of hypothesized multi-user signal parameter values. In block 11-4, the method continues with performing channel estimation using the possible AQPSK training sequence generated above. The selected value from the set of values of possible multi-user signal parameter values, and the resulting channel impulse response represent a first joint estimate of the multi-user signal parameter and channel impulse response. The channel estimation can be based, for example on either the correlations of the received signal with the above training sequence or based on the least squares method. It is noted that the use of channel estimation based on correlation instead of least squares may save many computations and improve estimation accuracy. In block 11-5, the method continues with determining an accuracy measure of how accurately the estimated channel impulse response matches the received signal, for example by computing the mean squared error (MSE); statistically, the smaller the MSE, the better the quality the channel and multi-user signal parameter estimate. The first time the determining step is performed, the accuracy measure is set as the best accuracy measure in block 11-6. Next, in block 11-7, the previous computing, performing and determining steps are repeated for another selected multi-user signal parameter to obtain another channel impulse response estimate. The another selected value from the set of values of possible multi-user signal parameter values, and the resulting channel impulse response represent another joint estimate of the multi-user signal parameter and channel impulse response. In block 11-8, the resulting accuracy measure is compared with the current best accuracy measure. In block 11-9 if the new accuracy measure is better than the current best accuracy measure, then the current best accuracy measure is replaced with the new accuracy measure. The steps are then repeated again, depending on how many values there are in the table, and the search algorithm. More generally, at least one of the steps of the method of FIG. 11 may be performed to jointly estimate the multi-user signal parameter and the channel impulse response.

The joint channel and SCPIR estimation method provides an efficient search algorithm so that only a small number of hypothesized SCPIR values need to be tried. One embodiment of this method is to apply the binary search algorithm to the joint channel and SCPIR estimation With a binary search algorithm, the whole range of values is divided into two parts starting from 0, and then a determination is made of whether the SCPIR value is on the right or left side of 0 dB. If on the right then divide the half into two parts again, and so on. This method is both efficient and elegant and is especially useful when the range of SCPIR is large. For example, in VAMOS II, the SCPIR range is from −10 dB to +10 dB, To have a search resolution of 1 dB, a total of 21+1=22 hypothesized SCPIR values need to be tried using brute-force searching method which creates a high computational load.

In another example, the joint channel and SCPIR estimation is performed using a method disclosed in Meyer, R.; Gerstacker, W. H.; Obernosterer, F.; Ruder, M. A.; Schober, R.; "Efficient Receivers for GSM MUROS Downlink Transmission," Personal, Indoor and Mobile Radio Communications, 2009 IEEE 20th International Symposium on, vol., no., pp. 2399-2403, 13-16 Sep. 2009, hereby incorporated by reference in its entirety.

Another Mobile Device

Figure 12:
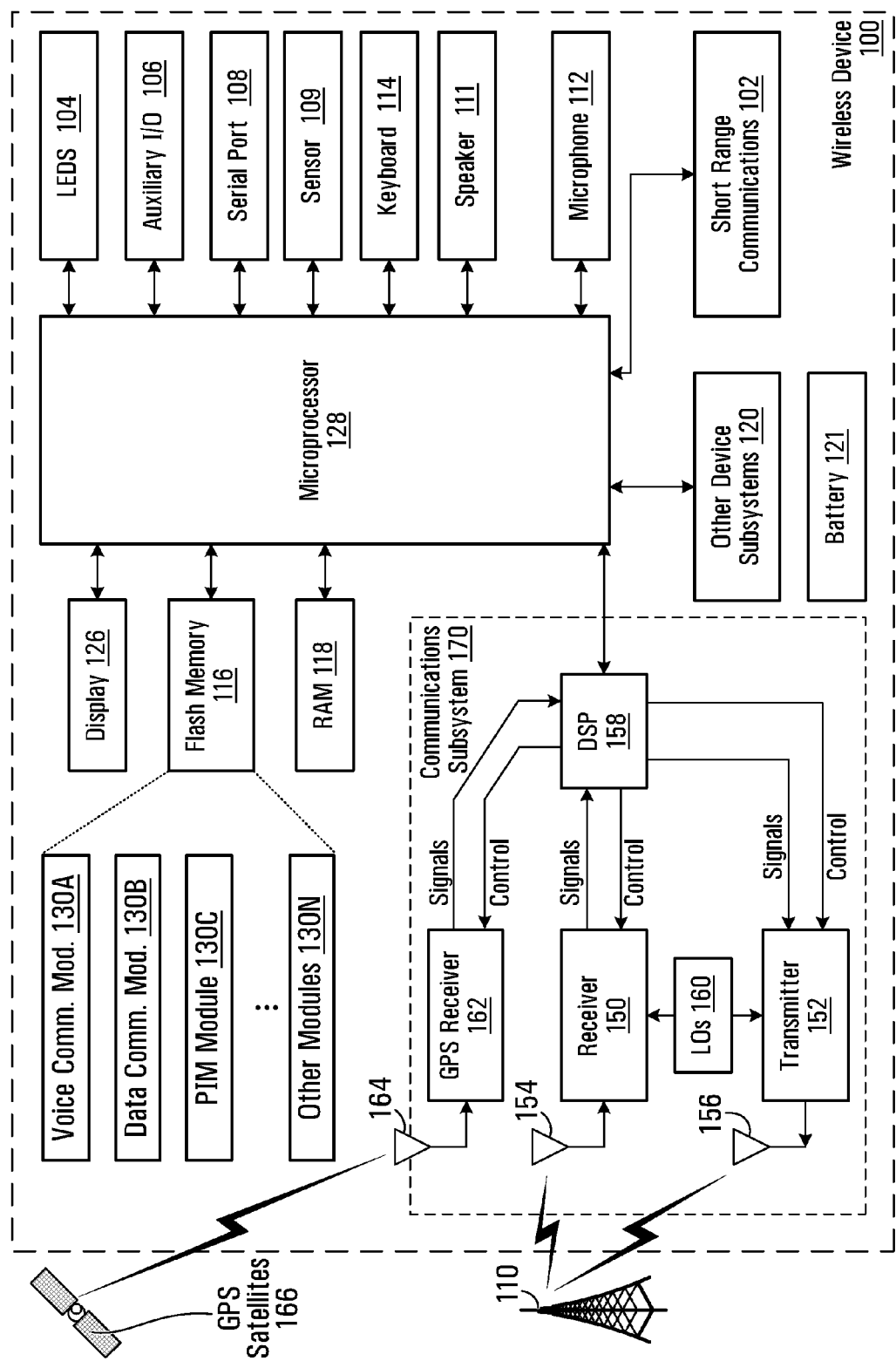
FIG. 12 is a block diagram of a mobile communication device comprising the demodulator of FIG. 3.

Referring now to FIG. 12, a block diagram is shown of an embodiment of another mobile device 100 that may implement any of the device methods described herein. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may, for example, include one or more modules that control the execution of the methods described above.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO.

The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, (often referred to as a SIM card), in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a device, the method comprising:
receiving a signal in a receiver;
estimating a multi-user signal parameter and a channel impulse response;
determining whether the signal is a single-user signal or a multi-user signal based on the estimated multi-user signal parameter;
generating frequency offset estimates based on whether the signal is a single-user signal or a multi-user signal; and
wherein estimating the multi-user signal parameter and the channel impulse comprises jointly estimating the multi-user signal parameter and the channel impulse response.

2. The method of claim 1 further comprising:
passing the frequency offset estimates to an Automatic Frequency Control (AFC) function to adjust a frequency of a local oscillator.

3. The method of claim 1, wherein generating frequency offset estimates based on whether the signal is a single-user signal or a multi-user signal comprises:
detecting data symbols using a multi-user detector if it is determined that the signal is a multi-user signal; and
detecting data symbols using a single-user detector if it is determined that the signal is a single-user signal;
estimating noiseless samples depending on whether multi-user or single-user signal has been received;
generating frequency offset estimates from a plurality of noiseless sample estimates.

4. The method of claim 3 further comprising:
estimating a channel impulse response;
wherein:
estimating the multi-user signal parameter and the channel impulse comprises jointly estimating the multi-user signal parameter and the channel impulse response;
receiving a signal comprises:
a) when the signal is a multi-user signal, receiving a multi-user AQPSK (Alpha quadrature phase shift keyed) burst based on complex-valued AQPSK symbols x(n)+jαy(n) where x(n) and y(n) are respectively real-valued transmit symbols for a first and a second user, and a is the multi-user signal parameter used to dynamically adjust the relative power levels of x(n) and y(n);
b) when the signal is a single user signal, receiving a single user GMSK (Gaussian minimum shift keyed) burst based on a real valued GMSK symbols x(n);
jointly estimating the multi-user signal parameter and the channel impulse response comprises jointly estimating a and the channel impulse response;
detecting data symbols using a multi-user detector if it is determined that the signal is a multi-user signal comprises detecting AQPSK symbols;
detecting data symbols using a single-user detector if it is determined that the signal is a single-user signal comprises detecting GMSK symbols;
estimating noiseless samples depending on whether multi-user or single-user signal has been received comprises estimating the noiseless samples based on the AQPSK symbols if it is determined that the burst is an AQPSK burst, and are based on the GMSK symbols if it is determined that the burst is a GMSK burst.

5. The method of claim 1 wherein jointly estimating the multi-user signal parameter and the channel impulse response comprises at least one of:
choosing N hypothesized multi-user signal parameter values in a range of the multi-user signal parameter;
adding a larger value to the set of values which is used to detect the situation that the received signal is a single user signal for the intended user;
computing a possible AQPSK training sequence using a selected value from the set of hypothesized multi-user signal parameter values;
performing channel impulse response estimation using the possible AQPSK training sequence;
determining an accuracy measure of how accurately the estimated channel impulse response matches the received signal;
after performing the determining step a first time, setting a current best accuracy measure to equal the determined accuracy measure;
repeating the computing, performing and determining steps for another selected value from the set of hypothesized multi-user signal parameter values to obtain another channel impulse response estimate and multi-user signal parameter value estimate;
compare the resulting accuracy measure of with the current best accuracy measure; or
if the new accuracy measure is smaller than the current best accuracy measure, replacing the current accuracy measure with the new accuracy measure.

6. The method of claim 4 wherein determining whether the signal is a single-user signal or a multi-user signal based on the estimated multi-user signal parameter comprises:
comparing the estimate of α to a threshold, and determining whether the burst is an AQPSK burst or a GMSK burst based on the comparison.

7. The method of claim 4 wherein detecting data symbols using a multi-user detector if it is determined that the signal is a multi-user signal comprises detecting AQPSK symbols comprises performing at least one of Joint-MLSE Viterbi Equalization or successive interference cancellation.

8. The method of claim 7 wherein performing at least one of Joint-MLSE Viterbi Equalization or successive interference cancellation comprises performing successive interference cancellation by:
if the multi-user signal parameter is above a threshold:
demodulating the first user signal to produce detected symbols of the first user;
reconstructing a first user signal using the estimated channel impulse response and multi-user signal parameter and detected symbols of the first user as inputs;
subtracting the reconstructed signal from the received signal to produce a difference signal; and
demodulating the difference signal to detect the symbols of the second user;
if the multi-user signal parameter is below the threshold:
first demodulating the second user signal to produce detected symbols of the second user;

reconstructing a second user signal using the estimated channel impulse response and multi-user signal parameter and the detected symbols of the second user as inputs;
subtracting the reconstructed signal from the received signal to produce a difference signal; and
demodulating the difference signal to detect the symbols of the first user.

9. The method of claim 4 wherein detecting data symbols using a single-user detector if it is determined that the signal is a single-user signal comprises detecting GMSK symbols by:
making a new channel estimate based on a training sequence contained in the single-user signal;
detecting the GMSK symbols using SAIC (single antenna interference cancellation) and Viterbi equalization.

10. The method of claim 4 wherein:
estimating noiseless samples based on the AQPSK symbol estimates comprises convolving the detected AQPSK symbols with the channel estimate determined during the joint detection of a and the channel; and
estimating noiseless samples based on the GMSK symbol estimates comprises convolving the detected GMSK symbols with a channel estimate determined based on a training sequence of the single user signal.

11. The method of claim 3 wherein generating a frequency offset estimate based on the noiseless samples comprises:

$$\text{determining } \hat{f}(n) = \frac{\angle(\hat{r}(n)^* r(n))}{2\pi n}$$

where $\hat{f}(n)$ is the frequency offset estimate;
$\angle(x)$ is the angle in radians of a complex value x;
$\hat{r}(n)$ is a noiseless sample;
$r(n)$ is a received sample.

12. The method of claim 11 further comprising:
determining a respective frequency offset estimate for each of a plurality of symbols of a burst;
averaging the frequency offset estimates.

13. A demodulator comprising:
a channel and multi-user signal parameter estimator that estimates a multi-user signal parameter and a channel impulse response from a received signal;
a burst type detector that determines whether the signal is a single-user signal or a multi-user signal based on the estimated multi-user signal parameter;
a frequency offset estimator that generates frequency offset estimates based on whether the signal is a single-user signal or a multi-user signal; and
wherein the channel and multi-user signal parameter estimator jointly estimates the multi-user signal parameter and the channel impulse response from the received signal.

14. A device comprising:
at least one antenna for receiving the signal;
the demodulator of claim 13;
a local oscillator;
an Automatic Frequency Control (AFC) function that adjusts a frequency of the local oscillator based on the frequency offset estimates.

15. The device of claim 14,
wherein the frequency offset estimator generates frequency offset estimates based on whether the signal is a single-user signal or a multi-user signal by:
detecting data symbols using a multi-user detector if it is determined that the signal is a multi-user signal; and
detecting data symbols using a single-user detector if it is determined that the signal is a single-user signal;
estimating noiseless samples depending on whether multi-user or single-user signal has been received;
generating frequency offset estimates from a plurality of noiseless sample estimates.

16. The device of claim 15 wherein:
the demodulator further comprises a channel and multi-user signal parameter estimator comprising said multi-user signal parameter estimator wherein the channel and multi-user signal parameter estimator jointly estimates the multi-user signal parameter and the channel impulse response from the received signal;
when the signal is a multi-user signal, the antenna receives a multi-user AQPSK burst based on complex-valued AQPSK symbols x(n)+jαy(n) where x(n) and y(n) are respectively real-valued transmit symbols for a first and a second user, and a is the multi-user signal parameter used to dynamically adjust the relative power levels of x(n) and y(n);
when the signal is a single user signal, the antenna receives a single user GMSK burst based on a real valued GMSK symbols x(n);
the joint channel and multi-user signal parameter estimator jointly estimates a and the channel impulse response;
the device further comprising:
a multi-user detector that detects data symbols of multiple users if it is determined that the signal is a multi-user signal comprises detecting AQPSK symbols;
a single user detector that detects data symbols of the intended user if it is determined that the signal is a single-user signal comprises detecting GMSK symbols;
a noiseless sample estimator that estimates noiseless samples depending on whether multi-user or single-user signal has been received comprises estimating the noiseless samples based on the AQPSK symbols if it is determined that the burst is an AQPSK burst, and are based on the GMSK symbols if it is determined that the burst is a GMSK burst.

17. The device of claim 14 wherein:
the joint multi-user signal parameter and channel impulse response estimator at least one of:
chooses N hypothesized multi-user signal parameter values in a range of the possible multi-user signal parameter;
adds a larger value to the set of values which is used to detect the situation that the received signal is a single user signal for the intended user;
computes a possible AQPSK training sequence using a selected value from the set of hypothesized multi-user signal parameter values;
performs channel impulse response estimation using the possible AQPSK training sequence;
determines an accuracy measure of how accurately the estimated channel impulse response matches the received signal;
after performing the determining step a first time, sets a current best accuracy measure to equal the determined accuracy measure;
repeats the computing, performing and determining for another selected value from the set of hypothesized multi-user signal parameter values to obtain another channel impulse response estimate and multi-user signal parameter value estimate;

compares the resulting accuracy measure of with the current best accuracy measure; or if the new accuracy measure is smaller than the current best accuracy measure, replaces the current accuracy measure with the new accuracy measure.

18. The device of claim 16 wherein the burst type detector determines whether the signal is a single-user signal or a multi-user signal based on the estimated multi-user signal parameter by:

comparing α to a threshold, and determining whether the burst is an AQPSK burst or a GMSK burst based on the comparison.

19. The device claim 16 wherein:

the noiseless estimator estimates noiseless samples based on the AQPSK symbol estimates by convolving the detected AQPSK symbols with the channel estimate determined during the joint detection of α and the channel; and the noiseless sample estimator estimates noiseless samples based on the GMSK symbol estimates by convolving the detected GMSK symbols with a channel estimate determined based on a training sequence of the single user signal.

20. The device of claim 16 wherein the frequency offset generator generates a frequency offset estimate based on the noiseless samples by:

determining $\hat{f}(n) = \frac{\angle(\hat{r}(n)^* r(n))}{2\pi n}$ where $\hat{f}(n)$ is the frequency offset estimate sample;

$\angle(x)$ is the angle in radians of a complex value x;

$\hat{r}(n)$ is a noiseless sample;

$r(n)$ is a received sample.

21. The device of claim 20 wherein the frequency offset estimator:

determines a respective frequency offset estimate for each of a plurality of symbols of a burst;

averages the frequency offset estimates.

22. A mobile device comprising the device of claim 14.

23. A non-transitory computer readable storage medium comprising computer executable instructions stored thereon that when executed by a computer cause the computer to:

receive a signal in a receiver;

estimate a multi-user signal parameter and a channel impulse response;

determine whether the signal is a single-user signal or a multi-user signal based on the estimated multi-user signal parameter;

generate frequency offset estimates based on whether the signal is a single-user signal or a multi-user signal; and wherein estimating the multi-user signal parameter and the channel impulse comprises jointly estimating the multi-user signal parameter and the channel impulse response.

* * * * *